United States Patent [19]

Locke

[11] Patent Number: 4,984,134
[45] Date of Patent: Jan. 8, 1991

[54] SURFACE MOUNT NON-POLAR TANTALUM CAPACITOR

[75] Inventor: Gerald M. Locke, Saco, Me.
[73] Assignee: AVX Corporation, New York, N.Y.
[21] Appl. No.: 465,452
[22] Filed: Jan. 16, 1990
[51] Int. Cl.[5] .............................................. H01G 9/00
[52] U.S. Cl. ................................... 361/529; 361/540; 29/25.03
[58] Field of Search ............. 361/402, 528, 529, 532, 361/535, 534, 539, 540; 29/25.03

[56] References Cited

U.S. PATENT DOCUMENTS

| | | |
|---|---|---|
| 3,196,323 | 7/1965 | Rogers et al. ............... 361/529 XR |
| 4,093,972 | 6/1978 | Voyles ............................ 361/540 |
| 4,166,286 | 8/1979 | Boissonnault ................... 361/532 |
| 4,349,860 | 9/1982 | Ohsawa ...................... 361/540 XR |
| 4,562,514 | 12/1985 | Sansa .................................. 361/540 |

Primary Examiner—Donald A. Griffin
Attorney, Agent, or Firm—Mark T. Basseches

[57] ABSTRACT

A service mountable non-polar capacitor assembly is disclosed. The assembly includes a pair of polar tantalum capacitors disposed in axial alignment the anode rods of the capacitors being mechanically and electrically connected as by welding. An insulating sleeve encompasses the body portions of the capacitors leaving projecting portions extending beyond the ends of the sleeve. The void space within the sleeve between the opposed ends of the capacitors may be filled by a polymeric insulating and rigidifying material.

4 Claims, 1 Drawing Sheet

SURFACE MOUNT NON-POLAR TANTALUM CAPACITOR

BACKGROUND AND FIELD OF THE INVENTION

The present invention is directed to the field of tantalum capacitors and more particularly relates to a non-polar surface mountable tantalum capacitor.

PRIOR ART

Tantalum capacitors are valued because of their ability to supply a high capacitance value within a limited volumetric space. Such capacitors are inherently polar devices. Where a non-polar tantalum capacitor is desired, the practice heretofore has been to assemble a pair of such capacitors with their cathodes electrically and mechanically bonded together, the anodes of the two capacitors defining the terminals of a non-polar capacitor.

As conducive to an understanding of the present invention it should be recognized that the anode leads of tantalum capacitors comprise tantalum rods projecting from the body of the capacitor. The rods may be welded to a tantalum projection extending from the body of the capacitor or may have an inner end embedded into the mass of the capacitor body. It is well recognized in the industry that the connection between the tantalum anode rod and the remainder of the capacitor (whether of the welded or embedded type) is fragile and subject to breakage resulting in a shorting or loss of connection to the remainder of the capacitor when subjected to manipulation such as experienced in affixing the capacitor to a circuit board etc. Additionally, since direct connections to the tantalum anode rod cannot be made by conventional methods, it is necessary that leads of a solderable material such as nickel or tinned nickel be connected to the tantalum rods in the course of manufacture of the capacitor, the user effecting connection to the capacitor through such affixed leads. Lead affixation is conventionally provided by a welding operation which is difficult to carry out between the disparate metals, and provides at best a relatively frangeable mechanical connection between the parts.

As a result of the foregoing, it will be appreciated that tantalum capacitors of the polar type, and particularly tantalum capacitors of the non-polar type are susceptible to compromise at the electrical connections to the anodes, both at the interface of connection between the tantalum rod and the capacitor body, and at the connection between the output lead and the tantalum rod. Obviously, in non-polar tantalum capacitors the areas of possible breakage are multiplied by two since external connections are made, in capacitors heretofore known, to anode leads extending from the capacitor assembly.

Heretofore, in the case of polar and particularly in the case of non-polar tantalum capacitors, to guard against breakage of anode connections reliance has been placed upon extensive use of rigidifying potting materials encasing the capacitor. The use of significant quantities of potting material, in addition to increasing materials costs, significantly enlarges the overall size of the capacitor assembly. Manifestly, such overall enlargement is a negative factor since it is desirable to utilize the available area of a circuit board in the most efficient manner.

SUMMARY OF THE INVENTION

The present invention may be summarized as directed to a surface mountable non-polar tantalum capacitor characterized in that the overall size of the capacitor is significantly reduced as compared to non-polar tantalum capacitors of equivalent value heretofore known. The invention may be further summarized as directed to a capacitor of the type described which is less expensive to manufacture in view of its elimination of the difficult steps of welding together different metals and in further view of the reduced number of welding steps necessary for the manufacture of the capacitor.

The invention is further directed to a capacitor of the type described which is more rugged than tantalum capacitors, and particularly non-polar tantalum capacitors heretofore known in that connections to the anode are less likely compromised than in the case of known non-polar capacitors.

In accordance with the invention a non-polar capacitor assembly is provided by aligning a pair of polar tantalum capacitors such that the tantalum anode rods engage and/or overlap, the rods being weldingly connected together. The sub-assembly is thereafter partially encased in a sleeve which encompasses the anode rods, the length of the sleeve being selected to leave exposed beyond the ends of the sleeve portions of the cathodes of the capacitors. Optionally, but preferably, the void space within the sleeve surrounding the anodes may be filled with a rigidifying potting material such as apoxy. The resultant capacitor utilizes a minimum of potting material, and is fabricated using only a single welding step (anode to anode) the welding step being simplified by virtue of the fact that the weld is effected between two tantalum rods rather than between disparate metals. Finally, attachment of the device to a printed circuit board or the like is effected by connection to the exposed cathodes and thus there is minimized mechanical and thermal stresses on the most fragile connections within the assembly, namely the connections between the anode rods and tantalum bodies and the connection between the anode rods themselves.

Accordingly, it is an object of the present invention to provide a surface mountable non-polar tantalum capacitor having a high reliability factor, a reduced overall dimension as compared to non-polar tantalum capacitors heretofore known, and in addition being capable of simplified manufacture. A further object of the invention is the provision of a low cost high reliability and readily manufactured surface mountable non-polar tantalum capacitor.

DETAILED DESCRIPTION OF THE VIEWS

Figure 1:
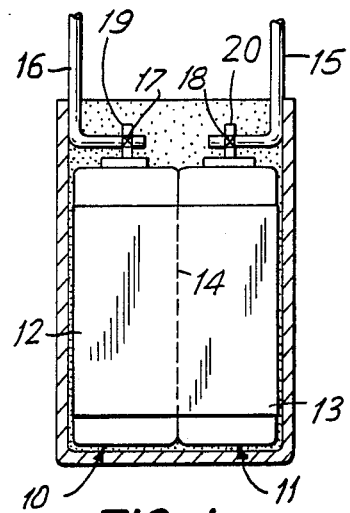
FIG. 1 is a schematic plan view of a radial non-polar tantalum capacitor in accordance with a prior art structure.
Figure 2:
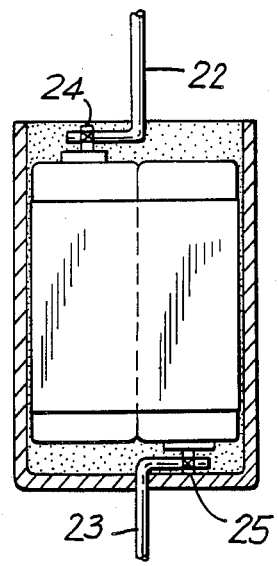
FIG. 2 is a view of a further prior art non-polar tantalum capacitor of the axial type.

Referring now to the drawings there are shown in FIGS. 1 and 2 in schematic fashion conventional non-polar tantalum capacitors. In the radial capacitor illustrated in FIG. 1 polar capacitors 10 and 11 are mounted side by side with their conductive cathode coatings 12, 13 in engagement. The junction 14 between the capacitors as well as the upper surface and the under surface (not shown) are overcoated with a conductive silver paste in a well known manner in order to assure good electrical connection between the cathodes 12,13. The external leads 15, 16 are tack welded as at 17,18 to anode rods 19,20. Since the connections 17,18 which are effected between anodes 19,20 of tantalum and leads 15,16 of nickel or tinned nickel are readily fractured, a large volume of potting material is necessarily disposed in the space 21 surrounding the connections of the leads to the anodes and surrounding the capacitor bodies.

The structure of FIG. 2 is similar to that of FIG. 1 except that the leads 22,23 extend axially of the assembly the cathodes of the two polar capacitors and the connections of the leads 22,23 to anodes 24,25 being accomplished as previously described.

Figure 3:
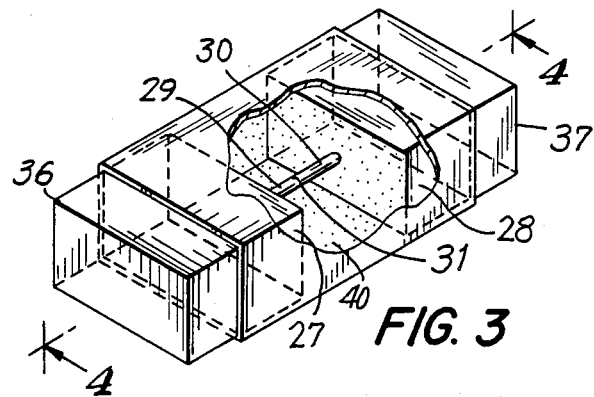
FIG. 3 is a schematic perspective view of a non-polar tantalum capacitor in accordance with the invention with parts broken away to show interior details.
Figure 4:
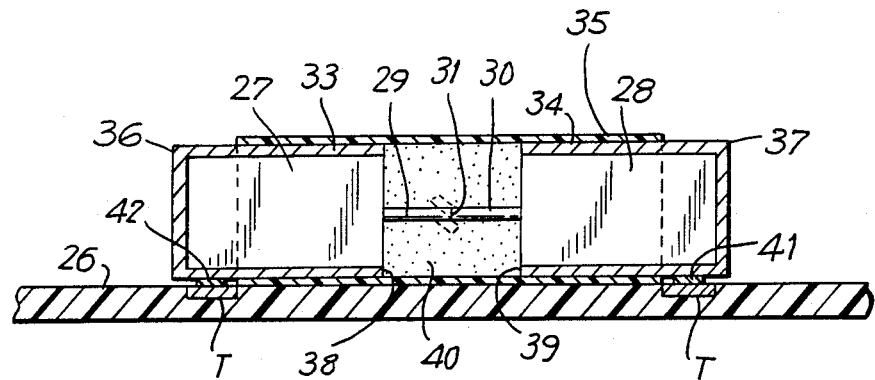
FIG. 4 is a vertical sectional view taken on the line 4,4 of FIG. 3.

There is shown in FIGS. 3 and 4 the novel surface mountable non-polar tantalum capacitor of the invention, the capacitor in FIG. 4 being depicted as attached to conductive traces T of a printed circuit board 26. The capacitor assembly comprises first and second conventional polar capacitors 27,28 having projecting anode rods 29,30 respectively. The anode rods 29,30 of tantalum may overlap for a distance or may be disposed in end abutting relation and are tack welded together as at 31. At this juncture, it should be noted that the tack weld between anode rods represents a relatively simple procedure and provides a durable connection since the weld is effected between identical materials.

The capacitors 27,28, as is conventional, include silvered cathode portions or coatings 33,34 (the thickness of such coatings having been exaggerated in FIG. 4 for purposes of illustration. A sleeve member 35 of Mylar or the like is preferably heat shrunk over the linked capacitors, the length of sleeve 35 being such as to leave end portions 36,37 of the cathodes 33,34 exposed beyond the ends of the sleeve. Preferably the void area within the sleeve between the innermost opposed ends 38,39 of the capacitors 27,28 is filled with an insulating and rigidifying compound 40 such as an epoxy compound. The epoxy material may be injected into the space in liquid form as by a puncture formed in the sleeve 35. The thickness of sleeve 35 has been greatly exaggerated in the drawings for purposes of clarity, and it will be appreciated that since the device is to be surface mounted, the sleeve should be of minimal thickness. Thicknesses of 1 mil or less have been found to be practical.

As shown in FIG. 4, the non-polar capacitor is inserted into the circuit by conductive components 41,42 spanning the space between the exposed cathode portions and traces T, the members 41,42 being formed as by solder balls or by conductive polymeric materials.

As will be apparent from the above description, there is provided in accordance with the invention a compact and durable non-polar surface mountable capacitor. The external connections to the assembly are effected to the cathodes of the polar capacitors forming the assembly, thereby isolating the more fragile anodes from thermal and mechanical stresses experienced in the course of affixation of the capacitor. The capacitor structure eliminates the need of forming welds between different metals and reduces the number of welds necessary as contrasted with prior art non-polar devices.

As will be apparent to those skilled in the art and familiarized with the instant disclosure, numerous variations in details of construction may be made without departing from the spirit of the invention. Accordingly, the same is to be broadly construed within the scope of the appended claims.

I claim:

1. A surface mounted non-polar tantalum capacitor assembly comprising first and second polar capacitor units, said units each including a body portion having side surfaces and end surfaces, said side surfaces including a conductive coating coupled to the cathodes of said capacitors, each of said capacitor units having a tantalum anode rod projecting from a said end surface and extending parallel to a said side surface, said units being disposed in spaced end to end relation with the rod of each said unit directed toward and engaging the rod of the other said unit, said rods being weldingly connected, the combination including an insulating sleeve tightly encompassing central portions of said body portions and entirely encompassing said rods, increments of said conductive coating of said body portions projecting beyond the opposite ends of said sleeve.

2. A capacitor assembly in accordance with claim 1 wherein said body portions are rectangular in transverse section.

3. A capacitor in accordance with claim 1 wherein said rods are in partial overlapping relation.

4. A capacitor assembly in accordance with claim 1 and including a polymeric insulating fill disposed within said sleeve in encompassing relation of said rod.

* * * * *